June 2, 1959  C. R. NORRIS  2,889,162
SWAB LINE CONNECTION WITH FRANGIBLE ELEMENT
Filed Feb. 3, 1958
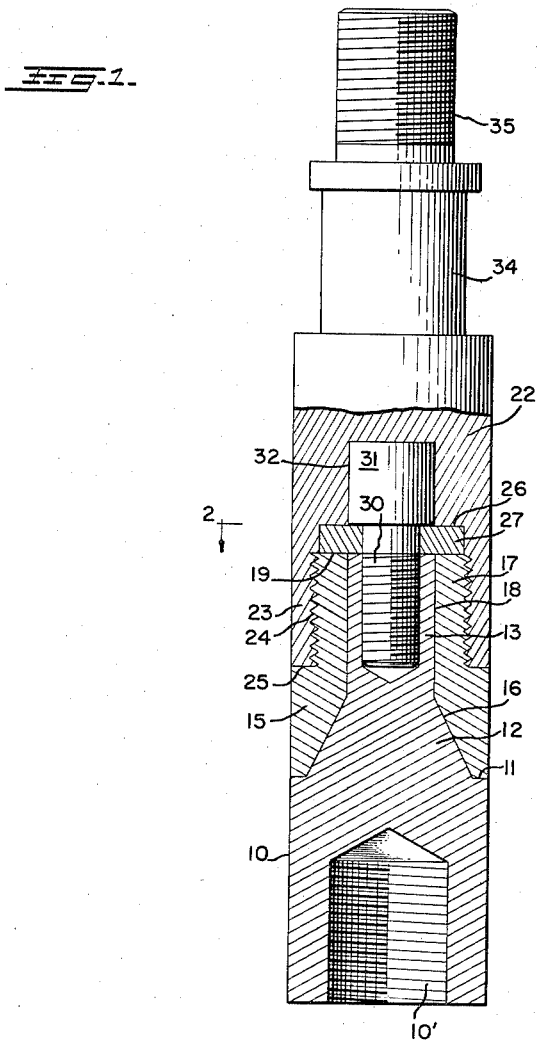
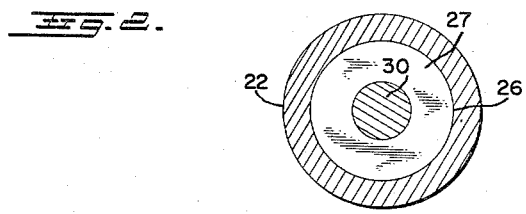
INVENTOR:
Charles R. Norris
BY: Baldwin & Wight
his ATTORNEYS

2,889,162
SWAB LINE CONNECTION WITH FRANGIBLE ELEMENT

Charles R. Norris, Cement, Okla.

Application February 3, 1958, Serial No. 712,698

6 Claims. (Cl. 287—125)

This invention relates generally to a swab line connection for oil wells, although the invention is not restricted to such use, as will become apparent.

In working and servicing oil wells, different tools sometimes become lodged in the tubing and can be removed only with substantial difficulty, usually through the use of a fishing tool. Such a difficulty occurs, for example, with well swabs, and it is highly desirable that when a swab becomes lodged, the line be disconnected therefrom to facilitate the use of a "grab" for exerting the necessary force on the swab to pull it from the well.

An important object of the present invention is to provide a novel type of simple connection for a swab line which, during the normal swab operation, remains wholly intact, but which is adapted to give way so as to permit the removal of the line if the swab becomes lodged and a pull greater than the normal pull is transmitted to the swab line to cause the connection to give way, whereupon the usual fishing operation can be performed.

A further object is to provide a device of this character which involves a simplified type of frangible element and the combination thereof with the other elements of the assembly so that normal forces transmitted in the swabbing operation are readily absorbed while the frangible element remains intact, and which is of such nature, in combination with the other elements of the device, as to be breakable upon the transmission of substantially increasing pulling forces through the swab line.

A further object is to provide a device of the character just referred to wherein the frangible element has force transmitting faces perpendicular to the line of the pull on the swab line so as to readily withstand the normal strains to which it is subjected, and which is adapted to readily fracture for the separation of the joint with which it is associated to permit the removal of the swab line and the insertion of a fishing tool for the removal of the swab.

A further object is to provide such a device wherein the fracturing of the frangible element and the removal of the line from the tubing provides an effective "fishing neck" which readily may be grasped by a fishing tool for the removal of the swab from the well.

Other objects and advantages of the invention will become apparent during the course of the following description.

In the drawing I have shown one embodiment of the invention. In this showing:

Figure 1 is a sectional view through the swab line joint forming the subject matter of the present invention, parts being shown in elevation; and Figure 2 is a transverse sectional view on line 2—2 of Figure 1.

Referring to Figure 1, the numeral 10 designates the body of the device having a threaded opening 10' at the lower end for connection with the swab or the elements leading thereto beneath the device. Spaced from the bottom thereof, the body 10 is provided with an annular shoulder 11 radially inwardly of which is an upwardly extending integral frusto-conical section 12. The upper extremity of the body 10 is formed as an axial extension 13 of circular cross section.

An intermediate joint section 15 has its lower end seating on the shoulder 11 and is provided with a frusto-conical opening 16 fitting the section 12, the upper end 17 of the section 15 having an axial opening 18 of circular cross section fitting the upper end 13 of the body. The upper extremities of the portion 13 of the body and the portion 17 of the member 15 lie flush, preferably in a plane perpendicular to the axis of the elements described. Such flush surface is indicated by the numeral 19.

An upper member 22 is provided with an axially depending portion 23 threaded as at 24 on the end 17, which is of reduced diameter so that the outer surfaces of the members 10, 15 and 22 form continuous concentric surfaces of circular cross section. The member 15 is thus provided below the threaded portion thereof with an annular shoulder 25 on which seats the lower extremity of the downwardly projecting portion 23 of the upper member 22.

The upper member 22 is provided with a relatively large axial recess 26, the top surface of which is flat and parallel to and spaced from the surface 19. A ring or apertured disk 27 of frangible material is arranged in the recess 26. The top and bottom surfaces of the disk 27 are flat and parallel to each other and seat in flat relation respectively against the surfaces 26 and 19. A screw 30 projects through the opening in the disk 27 and is axially threaded into the portion 13 of the body 10. The upper end of the screw 30 is provided with a head 31 arranged in a recess 32 formed in the upper member 22. It will be noted that the diameter of the recess 32 is approximately equal to the diameter of the body portion 13, and the head 31 in any event should not be larger than such diameter.

The upper end of the upper member 22 is provided with an upwardly extending axial shank portion 34, the upper end of which is reduced and externally threaded as at 35 for suitable connection with a conventional socket on a swab line.

Operation

The assembling of the elements of the device is quite simple and will be rather obvious from the drawing and foregoing description. The member 15 is placed in position on the body 10, whereupon the frangible member or disk 27 is placed on the upper end of the portion 17 of the member 15, and the screw 30 is secured in position. This causes the frangible element 27 to hold the intermediate member 15 normally seated downwardly on the body 10. It then merely is necessary to apply the upper member 22 by screwing it into position as shown in Figure 1.

In the normal operation of a swab line, assuming that the device is used with such a tool, the usual forces will be transmitted to the swab through the swab line and through the joint forming the present invention. Downward forces will be transmitted through the members 22 and 15, and thus to the body 10 and to the swab. Upward pulling forces on the swab line will be transmitted through the threads 24 from the member 22 to the intermediate member 15, and will be transmitted from such member to the body member 10 through the frangible member 27, head 31 and screw 30. While the member 27 is frangible, the seating surfaces at the top and bottom thereof are parallel and perpendicular to the axial line of forces transmitted through the joint, and the frangible member easily can be designed to withstand forces transmitted in the manner referred to in the normal operation of the swab.

Assuming that the swab becomes lodged, increased pulling force, for example 12,000 lbs. or more, will be transmitted through the swab line to the upper member 22. This force will be transmitted through the threads 24 to the member 15 and from the latter to the portion of the frangible member against which the upper body portion 17 seats. The frangible member under such conditions will fracture. The inner portion of the member 27 will remain in position beneath the head 31 while the radially outer portion will be pulled upwardly with the upper end of the member 15, which is free to slide upwardly over the head 31. Thus, fracturing of the frangible member 27 will enable the intermediate member 15 and upper member 22 to separate upwardly from the body 10.

The operation referred to leaves in position in the well the members 10, 30 and 31 and the radially inner portion of the frangible member 27. Under such conditions, the upper end or neck portion 13 of the body and the frusto-conical portion 12 of the body will be left exposed, thus providing a fishing neck which may be engaged by the usual grab to exert whatever force is necessary on the swab to remove it from the well.

When the device is ready for use again, it merely is necessary to replace the frangible member 27 with a new member, whereupon the parts readily may be assembled in the manner described above.

From the foregoing it will be apparent that the present device is characterized by simplicity and economy in production and ease of assembly. It also provides for the efficient transmission axially of the device of forces normally employed in the swabbing operation. It also will be apparent that the easily engaged fishing neck will be exposed when the frangible member is broken and the swab line is removed from the tubing.

The device has been generally described as a swab line connection and has been so defined in the claims. It will be apparent, however, that the invention is not so limited in its use, but is equally capable of use in any installation in which a simple frangible connection of this type is desired.

The construction as shown embodies the invention in a preferred form, but it is intended that the disclosure be illustrative rather than definitive, the invention being defined in the claims.

I claim:

1. A swab line connection comprising a lower body having an upper end of reduced size, an intermediate member arranged around said upper end of said body and seating downwardly on said body, an upper member forming a connection between said intermediate member and a swab line, and means normally holding said intermediate member seated downwardly on said body and comprising a frangible swab line tension transmitting element arranged between said upper member and said intermediate member and having mechanical connection with said body to transmit to the latter upward pulling forces from said upper member, said intermediate member and said upper member being upwardly separable from said lower body upon fracturing of said frangible element.

2. A swab line connection comprising a lower body having an upper end of reduced size, an intermediate member arranged around said upper end of said body and seating downwardly on said body, an upper member forming a connection between said intermediate member and a swab line, said upper member having an annular recess at the top of said intermediate member, and means normally holding said intermediate member seated downwardly on said body and comprising a frangible swab line tension transmitting element arranged in said recess and having mechanical connection with the upper ends of said body and said intermediate member to transmit pulling forces from said upper member to said body, said intermediate member and said upper member being upwardly separable from said lower body and a swab line, said upper member having an 3. A swab line connection comprising a lower body having an upper end of reduced size, an intermediate member arranged around said upper end of said body and seating downwardly on said body, an upper member forming a connection between said intermediate member and a swab line, said upper member having an internal annular recess, and force transmitting means between said upper member and said body comprising an annular frangible member arranged in said recess and having portions engaging the upper ends of said intermediate member and said body, and an element fixed to said body and having a portion overhanging and engaging the top of said frangible member.

4. A swab line connection comprising a lower body having an upper end of reduced size, an intermediate member arranged around said upper end of said body and seating downwardly on said body, an upper member forming a connection between said intermediate member and a swab line, said upper member being provided with a relatively large downwardly opening recess and a recess of smaller diameter thereabove, an annular frangible member arranged in said larger recess and having its radially inner and outer portions overlying and engaging respectively the upper extremities of said body and said intermediate member, and a fastening element fixed at its lower end to said body and having an upper head overlying and engaging the top of the radially inner portion of the top surface of said frangible member, said head being no larger than the external diameter of the upper extremity of said body.

5. A swab line connection comprising a lower body reduced in diameter intermediate its ends to form an upwardly facing shoulder and tapered to decrease in diameter above said shoulder, said body having an upper end portion uniformly circular in cross section from the upper end of the tapered portion to the upper extremity of said body, an intermediate member having portions substantially fitting said shoulder, said tapered portion and said upper end portion of said body and seating downwardly against said body, an upper member having a depending flange portion threaded on the upper end portion of said intermediate member, the upper extremities of said body and said intermediate member lying in a common plane perpendicular to the axis of such elements to provide flush faces, an annular frangible member seating on said flush faces, and a fastening element fixed to said upper portion of said body and having a head lying above and engaging the radially inner portion of the upper surface of said frangible member, said head being no larger in diameter than the diameter of said upper end portion of said body.

6. A swab line connection comprising a lower body reduced in diameter intermediate its ends to form an upwardly facing shoulder and tapered to decrease in diameter above said shoulder, said body having an upper end portion uniformly circular in cross section from the upper end of the tapered portion to the upper extremity of said body, an intermediate member having portions substantially fitting said shoulder, said tapered portion and said upper end portion of said body and seating downwardly against said body, an upper member having a depending flange portion threaded on the uper end portion of said intermediate member, the upper extremities of said body and said intermediate member lying in a common plane perpendicular to the axis of such elements to provide flush faces, said upper member having upper and lower downwardly opening recesses, the latter of which is of substantially larger diameter than the upper recess, an annular axially apertured frangible member arranged in said lower recess and having a lower face engaging said flush faces, and a screw threaded axially into the upper portion of said body through the aperture in said frangible member, said screw having a head in said upper recess provided with a lower annular surface engaging the radially inner portion of the upper surface of said frangible member, said head being no larger in diameter than the diameter of the upper portion of said body.

References Cited in the file of this patent

UNITED STATES PATENTS

| | | |
|---|---|---|
| 1,610,414 | Bernard et al. | Dec. 14, 1926 |
| 1,923,132 | Witkin | Aug. 22, 1933 |
| 2,039,943 | Wickersham et al. | May 5, 1936 |